United States Patent
Kociba et al.

(10) Patent No.: US 8,550,054 B2
(45) Date of Patent: Oct. 8, 2013

(54) LINEAR TRANFORMATION ENGINE TORQUE CONTROL SYSTEMS AND METHODS FOR INCREASING TORQUE REQUESTS

(75) Inventors: Michael L. Kociba, Hartland, MI (US); Richard B. Jess, Haslett, MI (US); Zhong Li, Novi, MI (US); Jeffrey M. Kaiser, Highland, MI (US); Michael Livshiz, Ann Arbor, MI (US)

(73) Assignee: GM Global Technology Operations LLC

(*) Notice: Subject to any disclaimer, the term of this patent is extended or adjusted under 35 U.S.C. 154(b) by 958 days.

(21) Appl. No.: 12/633,124

(22) Filed: Dec. 8, 2009

(65) Prior Publication Data

US 2011/0132324 A1    Jun. 9, 2011

(51) Int. Cl.
*G06F 17/00* (2006.01)

(52) U.S. Cl.
USPC ........... 123/406.23; 701/51; 701/102; 477/85

(58) Field of Classification Search
USPC ................ 123/406.23, 436, 480; 701/51, 54, 701/84, 102; 477/85
See application file for complete search history.

(56) References Cited

U.S. PATENT DOCUMENTS

| | | | | |
|---|---|---|---|---|
| 5,025,380 A * | 6/1991 | Wataya et al. | ................. | 701/103 |
| 5,072,815 A * | 12/1991 | Jarvis | ................ | 477/85 |
| 5,091,854 A * | 2/1992 | Yoshimura et al. | ........... | 701/101 |
| 5,445,576 A * | 8/1995 | Motamedi et al. | ............ | 477/105 |
| 5,839,987 A * | 11/1998 | Sawamura et al. | ........... | 477/107 |
| 6,000,376 A * | 12/1999 | Hess et al. | ..................... | 123/333 |
| 6,704,638 B2 | 3/2004 | Livshiz et al. | | |
| 6,758,190 B2 * | 7/2004 | Denz et al. | ..................... | 123/350 |
| 6,907,337 B2 * | 6/2005 | Phillips et al. | ................... | 701/51 |
| 7,000,589 B2 * | 2/2006 | Matthews et al. | ............. | 123/350 |
| 7,069,905 B1 | 7/2006 | Livshiz et al. | | |
| 7,305,965 B2 * | 12/2007 | Zillmer et al. | ............. | 123/339.1 |
| 8,251,042 B2 * | 8/2012 | Ito | ............................ | 123/339.11 |

* cited by examiner

*Primary Examiner* — Mahmoud Gimie
*Assistant Examiner* — David Hamaoui

(57) ABSTRACT

A method of operating an engine of a vehicle includes generating a first torque request. The method includes generating a second torque request that is greater than and based on the first torque request, increasing a torque output of the engine based on the second torque request at a first rate and during a first period, and increasing the torque output of the engine based on the first torque request at a second rate and during a second period. The first period is distinct from and before the second period, and the first rate is greater than the second rate.

18 Claims, 6 Drawing Sheets

LINEAR TRANFORMATION ENGINE TORQUE CONTROL SYSTEMS AND METHODS FOR INCREASING TORQUE REQUESTS

FIELD

The present invention relates to engine control system, and more particularly, to control of engine torque upon a request for increased torque.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Torque output of an engine may be generated based on a driver torque request from a driver command module and based on and vehicle torque requests from vehicle control modules. The driver command module may generate a driver torque request based on an accelerator pedal signal. The vehicle control modules may, for example, include a transmission control module and a chassis control module that generate respective torque requests.

An engine control module may prioritize the driver and vehicle torque requests based on respective levels of the torque requests to generate a torque reference signal. The engine control module operates the engine to generate the engine torque output based on the torque reference signal. The torque reference signal may be set equal to the driver torque request when there are not any vehicle torque requests. The torque reference signal may be generated based on the vehicle torque request with the highest priority. A vehicle torque request that is greater than the driver torque request and the other vehicle torque requests may be given a highest priority.

The engine provides the highest priority torque request based on predetermined torque response gains within a certain response time. Ability to decrease the response time is limited, due to inherent delays associated with an air delivery system of an engine.

SUMMARY

In one respect, a method of operating an engine of a vehicle is provided. The method includes generation of a first torque request. The method also includes generation of a second torque request. The second torque request is greater than the first torque request. The second torque request is generated based on the first torque request. The method includes increase of a torque output of the engine based on the second torque request. The torque output is increased at a first rate during a first period. The method also includes increase of the torque output of the engine based on the first torque request. The torque output is increased at a second rate during a second period. The first period is distinct from the second period. The first period is before the second period. The first rate is greater than the second rate.

In other features, a system for an engine of a vehicle is described. The system includes an arbitration module, a torque augmentation module and a torque control module. The arbitration module generates a first torque request. The torque augmentation module generates a second torque request. The torque control module increases a torque output of the engine based on the second torque request. The torque control module increases the torque output at a first rate during a first period. The torque control module also increases the engine torque output based on the first torque request. The torque control module increases the torque output at a second rate during a second period. The first period is distinct from the second period. The first period is before the second period. The first rate is greater than the second rate.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
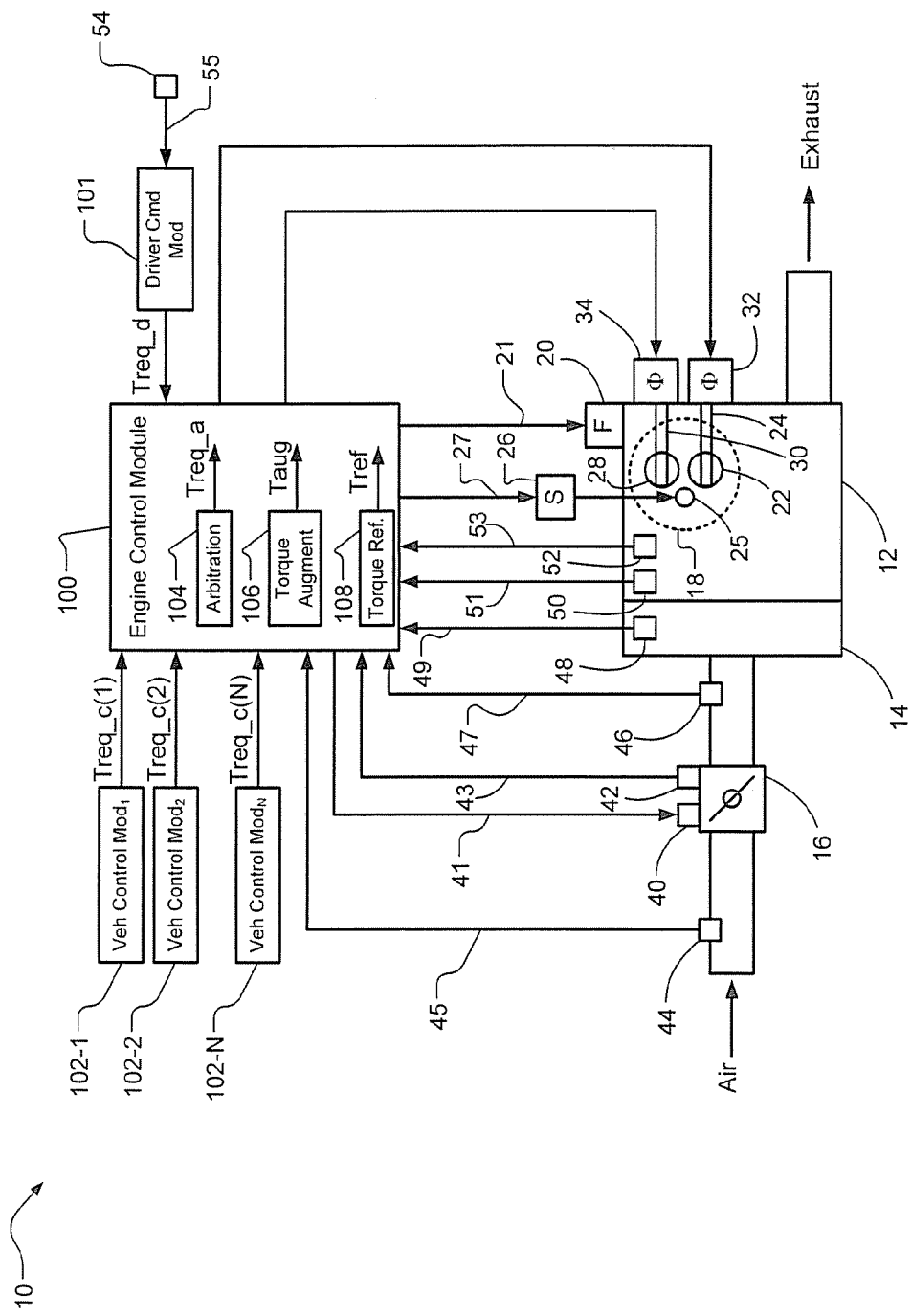
FIG. 1 is a functional block diagram of an exemplary engine system according to the principles of the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

In the following description, an "increasing torque request" is present when a vehicle torque request is generated that is greater than a current driver torque request. Conversely, a "decreasing torque request" is present when a vehicle torque request is generated that is less than a current driver torque request. A vehicle torque request may refer to a torque request generated by a vehicle system, such as a traction control system, a cruise control system, an air conditioning system, a power steering system, etc. A driver torque request refers to a torque request generated based on, for example, a vehicle operator input, such as an accelerator input (e.g., accelerator pedal input). The embodiments described herein provide responsive and stable control of an engine to satisfy increasing torque requests without an increase in torque response gains.

A vehicle torque request may be referred to as an "increasing torque request" when the vehicle torque request exceeds a driver torque request. The engine control module may operate to generate an increased level of engine torque output that exceeds the driver torque request based on an increasing torque request. For example, during a transmission downshift, an increased torque request may be generated to generate an engine torque output to accelerate gears of a transmission to a synchronous speed. This allows the transmission downshift within a certain downshift period. The engine control module may increase torque response gains to decrease response time to provide the increased torque request. Torque overshooting and/or reduced fuel economy can result due to the increased torque response gains.

The following described embodiments minimize and provide consistent torque response times for increasing torque requests while minimizing torque overshooting and while maintaining fuel economy. This torque response is provided without creating an underdamped or unstable system condition. Expediting increasing torque requests minimizes torque output delay time and enhances vehicle stability and transmission shift quality.

Referring now to FIG. 1, an engine control system 10 for increasing torque requests is shown. The engine control system 10 includes an engine 12 and an engine control module (ECM) 100. The engine 12 combusts an air/fuel mixture to produce engine torque. The ECM 100 operates the engine to produce the engine torque based on a torque reference signal Tref. The ECM 100 may generate the torque reference signal Tref based on an arbitrated torque signal Treq_a, which is generated based on a driver torque request Treq_d and vehicle torque requests Treq_c(1), Treq_c(2), . . . , Treq_c(N). The ECM 100 increases torque output of the engine 12 based temporarily overshoot torque levels that are greater than levels of increasing torque requests. The overshoot torque levels are targeted for a predetermined period before targeting of the increasing torque requests. This allows for quicker torque response times. In other words, time to provide an increasing torque request is reduced using the below described embodiments.

Air is drawn into an intake manifold 14 through a throttle 16. The throttle 16 regulates mass air flow into the intake manifold 14. Air within the intake manifold 14 is distributed into cylinders. The engine 12 may include N cylinders, where N is an integer. For illustrative purpose, only cylinder 18 is shown.

Fuel may be provided by a fuel actuator 20. The fuel actuator 20 may be a fuel injector. Fuel may be directly injected into the cylinder 18. The fuel actuator 20 may be controlled by a fuel command signal 21. The fuel actuator 20 injects fuel which is combined with the air to form air/fuel mixture in the cylinder 18. The fuel actuator 20 may be controlled to provide a desired air-to-fuel ratio within the cylinder 18.

An intake valve 22 selectively opens and closes to enable the air and/or fuel to enter the cylinder 18. The intake valve 22 may be actuated by an intake camshaft 24. A piston (not shown) compresses the air/fuel mixture within the cylinder 18. A spark plug 25 initiates combustion of the air/fuel mixture, driving the piston in the cylinder 18. The spark plug 25 may be controlled by a spark actuator 26 based on a spark command signal 27. The piston drives a crankshaft (not shown) to produce engine torque which drives a driveline mechanism of a vehicle. Combustion exhaust within the cylinder 18 is removed through an exhaust port when an exhaust valve 28 is open. Position of the exhaust valve 28 may be regulated by an exhaust camshaft 30. Although a single intake valve 22 and a single exhaust valve 28 are illustrated, the embodiments described herein may be applied to an engine with any number of intake and exhaust valves per cylinder 18.

The engine control system 10 may include an intake camshaft phaser 32 and an exhaust camshaft phaser 34 that respectively regulate rotational timing of the intake and exhaust camshafts 24, 30. Positions of the intake and exhaust valves 22, 28 may be regulated with respect to each other and/or with respect to the crankshaft. By regulating positions of the intake valve 22 and the exhaust valve 28, the air/fuel mixture the cylinder 18 is adjusted and engine torque output is regulated.

The throttle 16 may be controlled by a throttle actuator 40. The throttle actuator 40 may control the throttle 16 based on a throttle command signal 41. The engine 12 may also include a throttle position sensor (TPS) 42, an intake air temperature (IAT) sensor 44, a mass airflow (MAF) sensor 46, a manifold absolute pressure (MAP) sensor 48, an engine coolant temperature sensor 50, an engine speed sensor 52 and an accelerator pedal position sensor 54. The TPS 42 may generate a throttle position signal 43. The IAT sensor 44 may generate an IAT signal 45. The MAF sensor 46 may generate a MAF signal 47. The MAP sensor 48 may generate a MAP signal 49. The engine coolant temperature sensor 50 may generate a temperature signal 51. The engine speed sensor 52 may generate an engine speed signal 53. The accelerator pedal position sensor 54 may generate an accelerator pedal position signal 55.

The ECM 100 controls the engine to produce engine torque output based on torque request signals. The torque request signals may include the driver torque request signal Treq_d generated by a driver command module 101. The driver command module 101 may generate the driver torque request signal Treq_d based on the accelerator pedal position signal 55. The torque request signals may also include the vehicle torque request signals Treq_c(1), Treq_c(2), . . . , Treq_c(N) from respective vehicle control modules 102-1, 102-2, . . . , 102-N. A first one of the vehicle control modules 102-1 may be a transmission control module, and a second one of the control modules 102-2 may be a chassis control module. The vehicle control modules 102-1, 102-2, . . . , 102-N may be collectively referred to as vehicle control modules 102.

The ECM 100 may include an arbitration module 104, a torque augmentation module 106 and a torque reference module 108 that respectively generate the arbitrated torque signal Treq_a, a torque augmentation signal Taug and the torque reference signal Tref. The arbitrated torque signal Treq_a is generated based on the various driver and vehicle torque request signals. The torque reference signal Tref may be generated based on the arbitrated torque signal Treq_a and the torque augmentation signal Taug. The arbitrated torque signal Treq_a may be generated in association with an increasing torque request. The torque augmentation signal Taug refers to a temporary torque level that is greater than the arbitrated torque signal Treq_a. The torque augmentation signal Taug may be generated using a linear transformation. The linear transformation allows for overshooting gain values for throttle control. This is referred to as a predictive gain algorithm. The linear transformation may be used to determine an amount to overshoot gains associated with the arbitrated torque signal Treq_a. Generation of these signals is further described below.

The ECM 100 may operate the engine 12 to produce engine torque output based on the torque reference signal Tref. For example, the ECM 100 may generate the throttle command signal 41 based on the torque reference signal Tref and based on sensor signals. The sensor signals may include the throttle position signal 43, the IAT signal 45, the MAF signal 47, the MAP signal 49, the temperature signal 51 and the engine speed signal 53.

Figure 2:
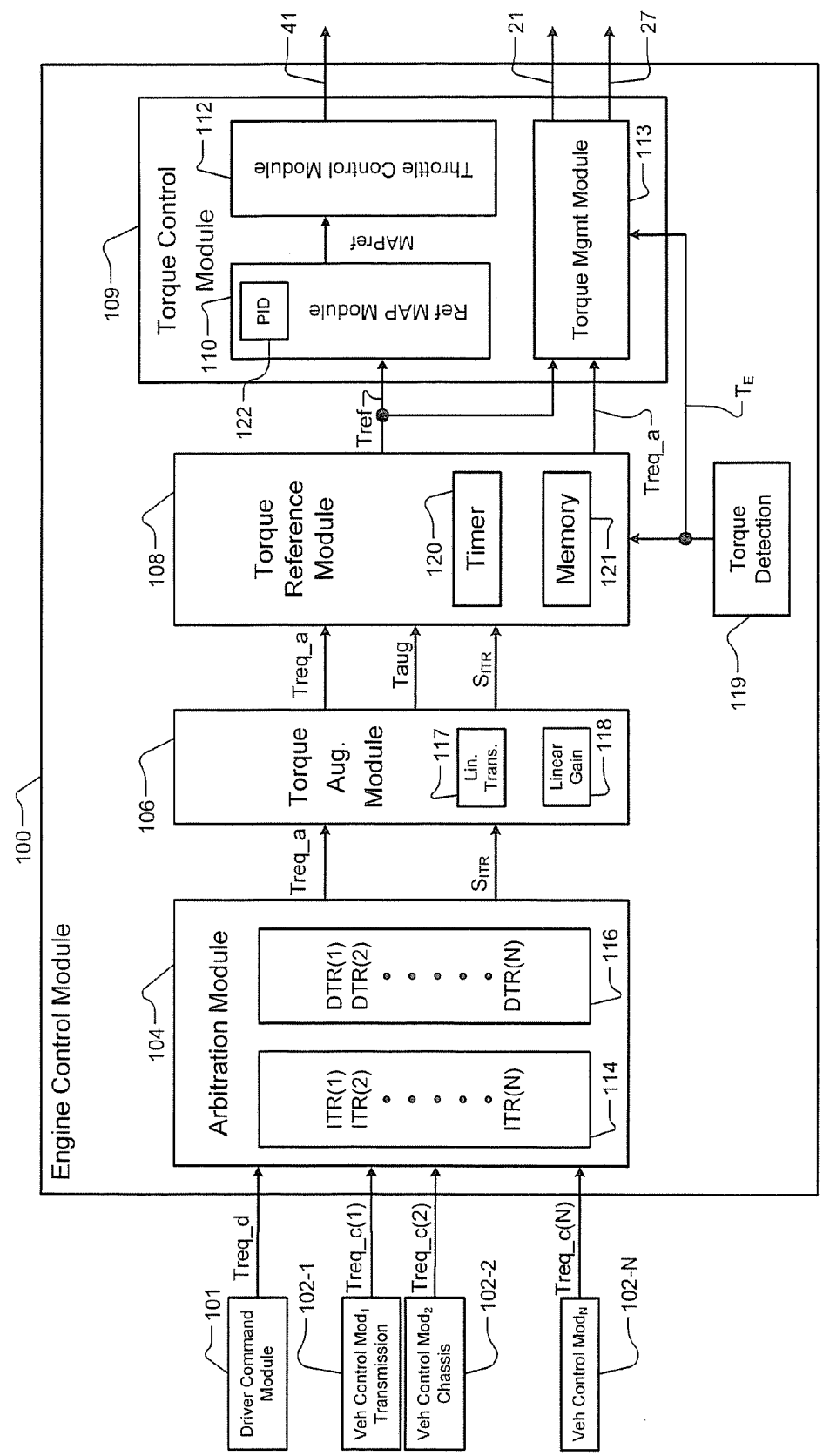
FIG. 2 is a functional block diagram of an engine control module according to the principles of the present disclosure.

Referring now also to FIG. 2, a functional block diagram of the ECM 100 is shown. The ECM 100 may generate the throttle command signal 41 based on the torque request signals including the driver request signal Treq_d generated by the driver command module 101 and Treq_c(1), Treq_c(2), . . . , and the vehicle torque request signals Treq_c(N) generated by the vehicle control modules 102-1, 102-2, . . . , and 102-N, respectively. The ECM 100 includes the arbitration module 104, the torque augmentation module 106, the torque reference module 108 and a torque control module 109. The torque control module 109 may include a reference MAP module 110, a throttle control module 112 and a torque management module 113.

The arbitration module 104 may generate an arbitrated torque signal Treq_a based on the torque request signals Treq_d, Treq_c(1), Treq_c(2), . . . , and Treq_c(N). The arbitrated torque signal Treq_a may be generated using a method disclosed in FIG. 5. The arbitration module 104 may also generate an increasing torque request (ITR) status signal $S_{ITR}$. The ITR status signal $S_{ITR}$ indicates whether the arbitrated torque signal Treq_a is an increasing torque request. The ITR status signal $S_{ITR}$ may be a logical TRUE when the arbitrated torque signal Treq_a is an increasing torque request. The ITR status signal $S_{ITR}$ may be a logical FALSE when the arbitrated torque signal Treq_a is not an increasing torque request.

The arbitration module 104 may include memory 114. The memory 114 may store an ITR condition flag for each one of the vehicle torque request signals Treq_c(1), Treq_c(2), . . . , and Treq_c(N), such as ITR condition flags ITR(1), ITR(2), . . . , and ITR(N). An ITR condition flag may indicate whether a vehicle torque request is an increasing torque request. An ITR condition flag may be a logical TRUE when the corresponding vehicle torque request is an increasing torque request. The ITR condition flag may be a logical FALSE when the corresponding vehicle torque request is not an increasing torque request.

The arbitration module 104 may include memory 116. The memory 116 may store a DTR condition flag for each one of the vehicle torque request signals Treq_c(1), Treq_c(2), . . . , and Treq_c(N), such as DTR condition flags DTR(1), DTR(2), . . . , and DTR(N). A DTR condition flag may indicate whether a vehicle torque request is a decreasing torque request. A DTR condition flag may be a logical TRUE when the corresponding vehicle torque request is a decreasing torque request. The DTR condition flag may be a logical FALSE when the corresponding vehicle torque request is not a decreasing torque request. The arbitration module 104 may also generate the ITR status signal $S_{ITR}$ based on the ITR condition flags and DTR condition flags. The ITR status signal $S_{ITR}$ may be generated using a method disclosed in FIG. 5.

The torque augmentation module 106 generates an augmented torque request signal Taug based on the arbitrated torque signal Treq_a and the ITR status signal $S_{ITR}$. The torque augmentation module 106 may include a linear transformation module 117 that performs a linear transformation of the arbitrated torque signal, and a linear gain module 118 that determines a linear multiplier and an offset component for the linear transformation. The linear transformation may be based on a complex linear model. The augmented torque request signal Taug may be generated using the linear transformation.

The torque reference module 108 generates the torque reference signal Tref based on the arbitrated torque signal Treq_a, the augmented torque request signal Taug, and the ITR status signal $S_{ITR}$. The torque reference signal Tref may, for example, be generated based on the arbitrated torque signal Treq_a and the augmented torque request signal Taug when one of the vehicle torque requests is an increasing torque request. The torque reference signal Tref may be generated using a method disclosed in FIG. 4.

The torque reference module 108 may also generate the torque reference signal Tref based on an engine torque signal $T_E$. A torque estimation module 119 may generate the engine torque signal $T_E$ based on an estimate of engine torque output. The torque estimation module 119 may estimate the engine torque using an engine torque model. An exemplary engine torque model is disclosed in U.S. patent application Ser. No. 11/769,797 filed on Jun. 28, 2007. The torque reference module 108 may include a timer 120 and memory 121.

The torque control module 109 may operate the engine 12 to generate an engine torque output based on the torque reference signal Tref. The torque control module 109 may generate the throttle command signal 41, the fuel command signal 21 and the spark command signal 27 based on the torque reference signal Tref. The torque control module 109 may operate the engine 12 via the throttle command signal 41, the fuel command signal 21 and the spark command signal 27. The fuel command signal 21 may be set to provide a stoichiometric air/fuel ratio. The spark command signal 27 may be set at a minimum spark advance timing for best torque (MBT).

The reference MAP module 110 generates a reference MAP signal MAPref based on the torque reference signal Tref. The reference MAP module 110 may include a proportional-integral-derivative (PID) module 122 which is used to generate the reference MAP signal MAPref. The PID module 122 may include PID gains. The torque reference signal Tref may cause the PID gains of the PID module 122 to increase based on the augmented torque request signal Taug. In another embodiment, the torque reference signal Tref does not cause the PID gains to increase, but rather remain at a constant level based on the augmented torque request signal Taug. The linear transformation increases the MAP of the engine, offsets a compressible flow equation, creates an increased throttle opening. The throttle control module 112 may generate the throttle command signal 41 based on the reference MAP signal MAPref.

The torque management module 113 may modify the spark command signal 27 away from the MBT and the fuel command signal 21 away from the stoichiometric ratio based on the arbitrated torque signal Treq_a and the engine torque signal $T_E$. For example, the torque management module 113 may reduce a rate of increase of the engine torque output by retarding the spark command signal 27 away from the MBT and/or by adjusting the fuel command signal 21 away from the stoichiometric ratio (e.g., fuel rate is decreased). The engine torque output with the rate of increase reduced via spark retardation and/or fuel rate reduction may be referred to as "managed engine torque". The managed engine torque may be generated when the engine torque signal $T_E$ exceeds the arbitrated torque signal Treq_a during an increasing torque request. The engine torque output generated when spark timing is operated at MBT and fuel is regulated at the stoichiometric ratio may be referred to as "unmanaged engine torque".

Figure 3:
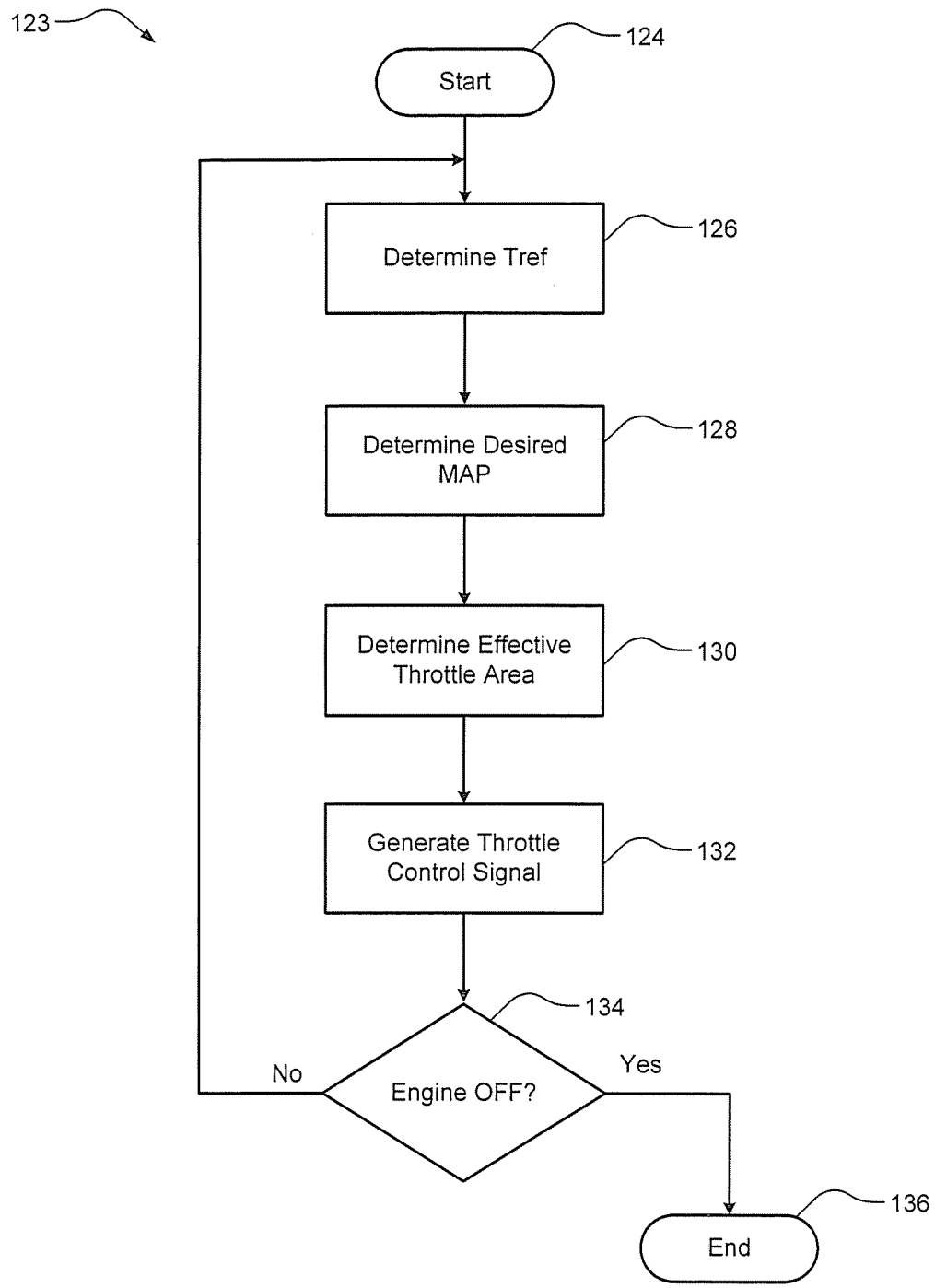
FIG. 3 illustrates a method of operating an engine.
Figure 4:
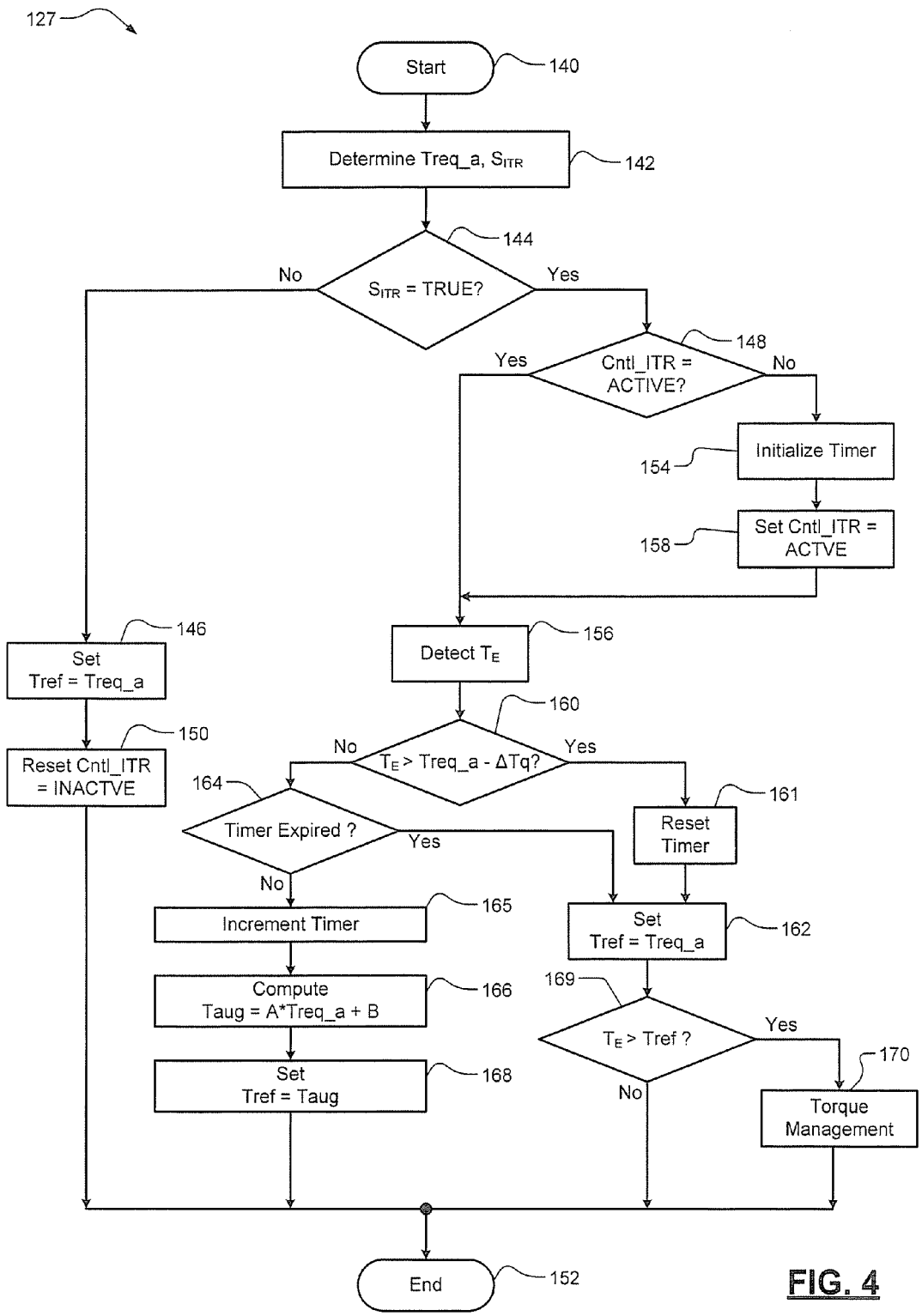
FIG. 4 illustrates a method of generating a torque reference signal according to the principles of the present disclosure.
Figure 5:
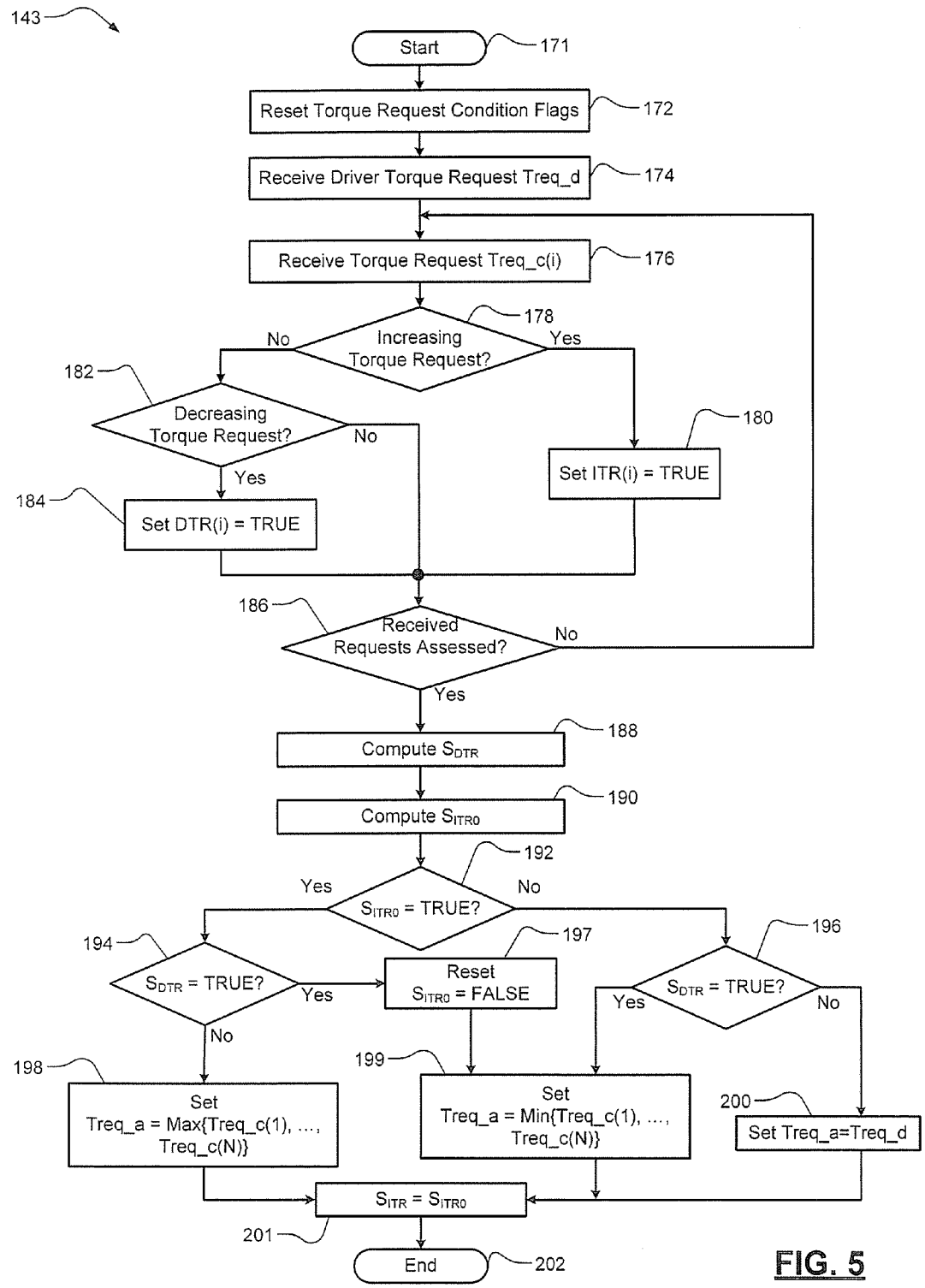
FIG. 5 illustrates a method of generating an arbitrated torque signal according to the principles of the present disclosure.

Referring now also to FIG. 3, a method 123 for operating the engine 12 is shown. Control of the ECM 100 may execute associated steps of the method 123. Although the following steps of FIGS. 3-5 are described primarily with respect to the embodiment of FIGS. 1, 2 and 6, the steps are iteratively performed and may be applied to other embodiments of the present disclosure. The method 123 may start at step 124.

In step 126, the ECM determines a torque reference and generates a torque reference signal Tref. The ECM may generate the torque reference signal Tref using a method 127 illustrated in FIG. 4.

In step 128, the reference MAP module 110 determines a desired MAP based on the torque reference signal Tref. The ECM 100 may generate the MAP signal MAPref based on a desired MAP. In step 130, the throttle control module 112 determines an effective throttle area Aeff for generating an absolute pressure in the intake manifold 14 based on the reference MAP signal MAPref. In step 132, the throttle control module 112 generates the throttle command signal 41 based on the effective throttle area Aeff. An exemplary method of determining a desired MAP and an effective throttle area and of generating a throttle command signal is disclosed in U.S. Pat. No. 7,069,905.

In step 134, control may end at step 136 when the engine is turned OFF, otherwise control returns to step 126.

Referring now also to FIG. 4, the method 127 of generating the torque reference signal Tref is shown. Control of the ECM 100 may execute associated steps of the method 127. The method 127 may start at step 140.

In step 142, the arbitration module 104 of the ECM 100 may determine an arbitrated torque request and generate the arbitrated torque signal Treq_a. The arbitration module 104 may also generate the ITR status signal $S_{ITR}$. The arbitration module 104 may generate the arbitrated torque signal Treq_a and the ITR status signal $S_{ITR}$ using a method 143 illustrated in FIG. 5.

In step 144, the ECM 100 detects the ITR status signal $S_{ITR}$. Control proceeds to step 146 when the ITR status signal $S_{ITR}$ does not indicate a logical TRUE, otherwise control proceeds to step 148.

In step 146, the torque reference module 108 sets a value of the torque reference signal Tref equal to the arbitrated torque signal Treq_a. In step 150, the torque reference module 108 resets an ITR control flag Cntl_ITR to INACTIVE. An inactive ITR control flag Cntl_ITR indicates that there is no increasing torque request. The ITR control flag Cntl_ITR may be one of ACTIVE and INACTIVE. The ITR control flag Cntl_ITR may be stored in memory 121 of the torque reference module 108. After step 150, control may end at step 152.

In step 148, the ECM 100 detects the ITR control flag Cntl_ITR. Control proceeds to step 154 when the ITR control flag Cntl_ITR is not ACTIVE, otherwise control proceeds to step 156.

In step 154, the torque reference module 108 may initially set the timer 120 to zero to start a first control event for the increasing torque request. The timer 120 may be used to measure an overshoot period, which may be predetermined and stored in memory. An augmented torque is used as torque reference during the first control event. Control proceeds to step 158 after step 154. In step 158, the torque reference module 108 sets the ITR control flag Cntl_ITR to ACTIVE. Control proceeds to step 156 after step 158.

In step 156, the torque reference module 108 detects an engine torque output. The engine torque output may be provided via an engine torque signal $T_E$. The torque estimation module 119 may generate the engine torque signal $T_E$ based on an estimation of engine torque output. The torque estimation module 119 may estimate the engine torque using an engine torque model. Control proceeds to step 160 after step 156.

In step 160, the torque reference module 108 determines a torque threshold Tq_th and compares the engine torque signal $T_E$ with the torque threshold Tq_th. The torque threshold Tq_th may be determined based on the arbitrated torque signal Treq_a and an error tolerance ΔTq. The torque threshold Tq_th may be determined, for example, using equation 1, $$Tq\_th = Treq\_a - \Delta Tq \qquad (1)$$

Control proceeds to step 161 when the engine torque signal $T_E$ is greater than the torque threshold Tq_th, otherwise the control proceeds to step 164.

In step 161, the torque reference module 108 resets the timer 120. The timer 120 may be a count-up timer that expires and is reset to zero when the timer 120 is greater than a predetermined (or calibrated) threshold. Although a count-up timer is described herein, a count-down timer may be used to measure the overshoot period. For example, the count-down timer may be initially set to a predetermined duration of an overshoot period in step 154 and decremented in step 165. The overshoot period expires when the count-down timer is equal to zero. A second control event for the increasing torque request starts upon expiration of the timer 120. Control proceeds to step 162 after step 161.

In step 162, the torque reference module 108 sets the torque reference signal Tref equal to the arbitrated torque signal Treq_a. The torque control module 109 may operate the engine 12 to increase an engine torque output when the engine torque output is less than the torque reference signal Tref. The engine torque output may be increased to a level of the torque reference signal Tref. A rate of increase of the engine torque output may be determined based on the torque reference signal Tref. Control proceeds to step 169 after step 162.

In step 164, the ECM 100 checks whether the overshoot period has expired. Control proceeds to step 162 when the timer 120 indicates the overshoot period has expired. The overshoot period expires when the timer 120 is greater than the predetermined threshold. For example only, in one embodiment, the overshoot period is approximately 200 milliseconds±10 milliseconds. In another embodiment, the overshoot period is 200 milliseconds. Control proceeds to step 165 to increment the timer 120 when step 164 indicates that the overshoot period has not expired, otherwise control proceeds to step 162. Control proceeds to step 166 after step 165.

In step 166, the torque augmentation module 106 generates the augmented torque request signal Taug based on the arbitrated torque request signal Treq_a. The augmented torque request signal Taug may be generated using a linear transformation of the arbitrated torque request signal Treq_a. The linear transformation module 117 may perform the linear transformation to increase gain and/or to adjust offset of the arbitrated torque request signal Treq_a. The linear transformation may include a linear multiplier A and an offset component B. The linear transformation provides a predictive feature by adjusting gain to overshoot and target an original torque request (e.g., the arbitrated torque request). The augmented torque request signal Taug may be generated, for example, using equation 2.

$$Taug = A * Treq\_a + B \qquad (2)$$

The linear gain module 118 may determine the linear multiplier A and the offset component B. The linear multiplier A and the offset component B may be predetermined constants. The linear multiplier A and the offset component B may further be determined based on the arbitrated torque signal Treq_a. For example, a difference between the arbitrated torque request signal Treq_a and the driver torque request signal Treq_d may be determined. A first magnitude of the linear multiplier A and a second magnitude of the offset component B may be determined based on the difference. The first magnitude may be greater than or equal to 1.0, and the second magnitude may be greater than or equal to 0.0 when arbitrated torque request signal Treq_a is an increasing torque request. The first magnitude may be set to 1.0 and the second magnitude may be set to 0.0 when the arbitrated torque request signal Treq_a is not an increasing torque request.

In step 168, the torque reference module 108 sets the torque reference signal Tref equal to the augmented torque request signal Taug. Responsive and stable control is provided by using the augmented torque as a torque reference for engine torque control over the overshoot period. The torque control module 109 may operate the engine 12 to increase an engine torque output that is less than the augmented torque request signal Taug. The engine torque output may be increased towards a level of the augmented torque request signal Taug. A rate of increase of the engine torque output may be determined based on the engine torque output and the augmented torque request signal Taug that is greater than the arbitrated torque signal Treq_a. The rate of increase of the engine torque may be greater than the rate of increase determined in step 162. The PID module 122 may maintain PID gains at respective constant calibration levels during the overshoot period.

The PID gains may be based on the augmented torque request signal Taug and/or the torque reference signal Tref. Since the augmented torque request signal is used instead of the arbitrated torque request signal Treq_a, the PID gains may be adjusted accordingly. The PID gains may be increased or maintained constant for the augmented torque request signal Taug relative to the PID gains that are used for the arbitrated torque request signal Treq_a. Control may end at step 152 or return to step 142 after step 168.

In step 169, the torque control module 109 determines whether an engine torque output $T_E$ exceeds the torque reference signal Tref. Control proceeds to step 152 to end when the engine torque output $T_E$ does not exceed the torque reference signal Tref. Control proceeds to step 170 when the engine torque output $T_E$ exceeds the torque reference signal Tref.

In step 170, the torque management module 113 generates managed engine torque using spark retardation and/or fuel rate reduction to minimize an overshoot of the engine torque output. This reduces a rate of increase of the engine torque output. The rate of increase of the engine torque output is less than the rate of increase determined in step 162.

Referring now also to FIG. 5, the method 143 of generating the arbitrated torque signal Treq_a is shown. Control of the arbitration module 104 may execute associated steps of the method 143. The method 143 may start at step 171.

In step 172, the arbitration module 104 resets each one of the ITR condition flags ITR(1), ITR(2), ..., ITR(N) and each corresponding one of the DTR condition flags DTR(1), DTR(2), ..., DTR(N). In step 174, the arbitration module 104 receives the driver torque request signal Treq_d. In step 176, the arbitration module 104 receives a vehicle torque request signal Treq_c(i) from one of the vehicle control modules 102-1, 102-2, ..., 102-N.

In step 178, the arbitration module 104 determines whether the vehicle torque request signal Treq_c(i) is an increasing torque request. An increasing torque request may be determined, for example, when expression 3 is satisfied.

$$Treq\_c(i) > Treq\_d \quad (3)$$

Control proceeds to step 180 when the vehicle torque request signal Treq_c(i) represents an increasing torque request, otherwise control proceeds to step 182.

In step 180, the arbitration module 104 sets a value of logical TRUE to an ITR condition flag ITR(i) associated with the vehicle torque request signal Treq_c(i). Control proceeds to step 186 after step 180.

In step 182, the arbitration module 104 determines whether the vehicle torque request signal Treq_c(i) represents a decreasing torque request. A decreasing torque request may be determined, for example, when expression 4 is satisfied.

$$Treq\_c(i) < Treq\_d \quad (4)$$

Control proceeds to step 184 when the vehicle torque request signal Treq_c(i) is a decreasing torque request, otherwise control proceeds to step 186.

In step 184, the arbitration module 104 sets a value of logical TRUE to a DTR condition flag DTR(i) associated with the vehicle torque request signal Treq_c(i). Control proceeds to step 186 after step 184.

In step 186, the arbitration module 104 determines whether each of the vehicle torque requests generated by the vehicle control modules 102-1, 102-2, ..., 102-N are assessed. Each of the vehicle torque requests may be assessed as an increasing torque request, a decreasing torque request, or neither an increasing torque request or a decreasing torque request (for example, a stable constant). Control proceeds to step 188 when each one of the torque requests are assessed, otherwise control returns to step 176 to process additional torque request(s).

In step 188, the arbitration module 104 generates a DTR status signal $S_{DTR}$. The DTR status signal $S_{DTR}$ indicates when at least one of the vehicle torque request signals Treq_c(1), ..., Treq_c(N) is a decreasing torque request. The DTR status signal $S_{DTR}$ indicates a logical TRUE when there is at least one decreasing torque request. The DTR status signal $S_{DTR}$ indicates a logical FALSE when none of the vehicle torque request signals Treq_c(1), ..., Treq_c(N) is a decreasing torque request. The DTR status signal $S_{DTR}$ may be generated by performing a non-exclusive OR logical operation of the DTR condition flags DTR(1), DTR(2), ..., DTR(N). The DTR status signal $S_{DTR}$ may be generated, for example, using equation 5.

$$S_{DTR} = DTR(1) \cup DTR(2) \cup \ldots \cup DTR(N) \quad (5)$$

In step 190, the arbitration module 104 generates a preliminary ITR status signal $S_{ITR0}$. The preliminary ITR status signal $S_{ITR0}$ indicates when at least one of the vehicle torque request signals Treq_c(1), ..., Treq_c(N) is an increasing torque request. The preliminary ITR status signal $S_{ITR0}$ indicates a logical TRUE when there is at least one increasing torque request. The preliminary ITR status signal $S_{ITR0}$ indicates a logical FALSE when there is not an increasing torque request. The preliminary ITR status signal $S_{ITR0}$ may be generated by performing a non-exclusive OR logical operation on the ITR condition flags ITR(1), ITR(2), ..., ITR(N). The preliminary ITR status signal $S_{ITR0}$ may be generated, for example, using equation 6.

$$S_{ITR0} = ITR(1) \cup ITR(2) \cup \ldots \cup ITR(N) \quad (6)$$

In step 192, the arbitration module 104 detects the preliminary ITR status signal $S_{ITR0}$. Control proceeds to step 194 when the preliminary ITR status is TRUE, otherwise control proceeds to step 196.

In step 194, the arbitration module 104 detects the DTR status signal $S_{DTR}$. Control proceeds to step 197 when the DTR status is TRUE, otherwise control proceeds to step 198.

In step 196, the arbitration module 104 detects the DTR status signal $S_{DTR}$. Control proceeds to step 199 when the DTR status is TRUE, otherwise control proceeds to step 200.

In step 197, the arbitration module 104 resets the preliminary ITR status signal $S_{ITR0}$ to FALSE when the DTR status $S_{DTR}$ indicates a decreasing torque request. Control proceeds to step 199 after step 197.

In step 198, an increasing torque request is detected. The arbitration module 104 sets the arbitrated torque signal Treq_a equal to a maximum of the vehicle torque request signals Treq_c(1), . . . , Treq_c(N). A control event associated with the increasing torque request may be performed based on the maximum of the vehicle torque request signals. Control proceeds to step 201 after step 198.

In step 199, a decreasing torque request is present. The arbitration module 104 sets the arbitrated torque signal Treq_a equal to a minimum of the vehicle torque request signals Treq_c(1), . . . , Treq_c(N). A control event associated with the decreasing torque request may be performed based on the minimum of the vehicle torque request. Control proceeds to step 201 after step 199.

In step 200, the arbitration module 104 sets the arbitrated torque signal Treq_a equal to the driver torque request signal Treq_d. Control proceeds to step 201 after step 200.

In step 201, the arbitration module 104 generates the ITR status signal $S_{ITR}$ by setting the ITR status signal $S_{ITR}$ equal to the preliminary ITR status signal $S_{ITR0}$. Control may end at step 202 after step 201.

Figure 6:
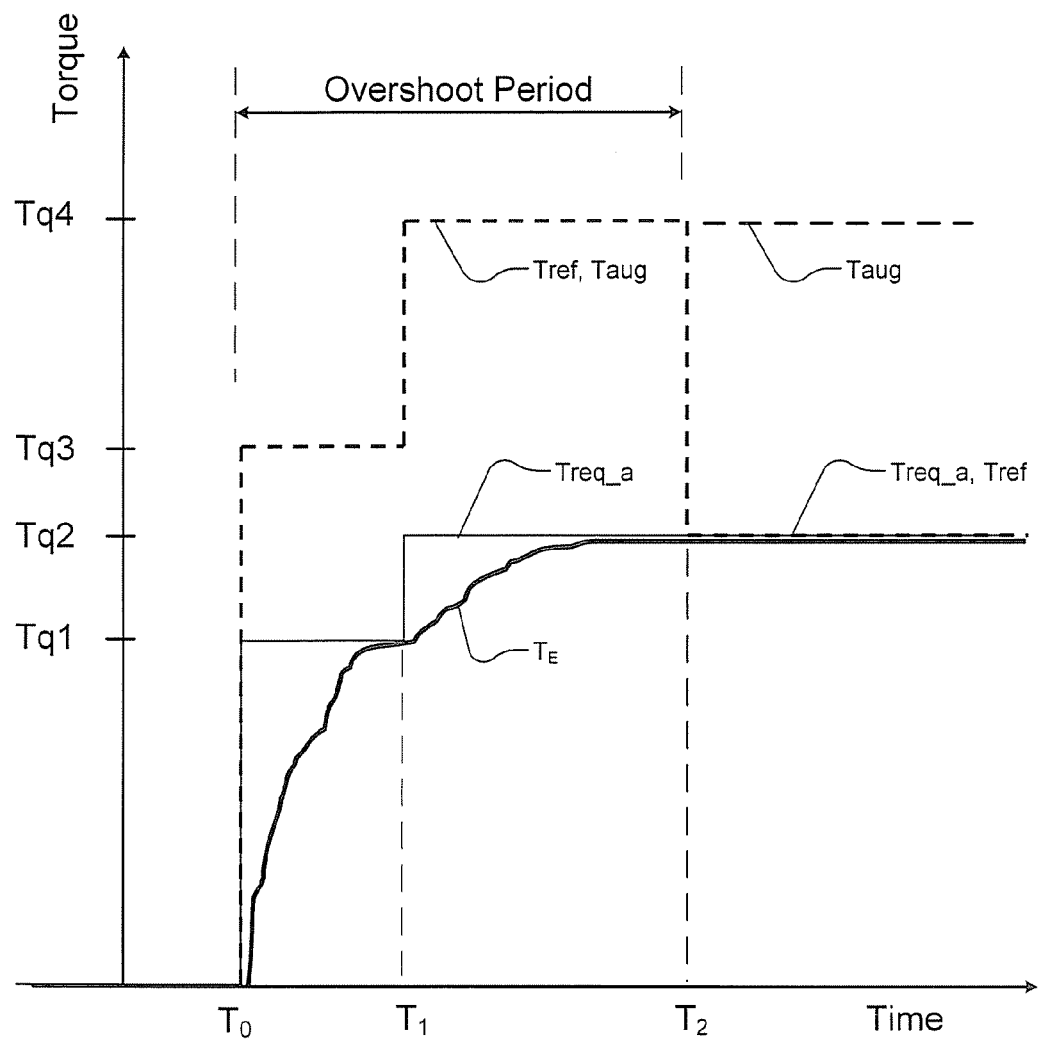
FIG. 6 is a plot of example signals generated during an event of increasing torque request according to the principles of the present disclosure.

Referring now to FIG. 6, a plot of example signals generated during an event of increasing torque request is shown. An arbitrated torque signal Treq_a is generated at time $T_0$ which has a level of Tq1. At time $T_1$ the arbitrated torque signal Treq_a, as an example, may be increased to a level of Tq2 and maintained at the level of Tq2 after $T_1$. An augmented torque request signal Taug is generated at $T_0$ based on Treq_a, and has a level of Tq3. The augmented torque request signal Taug may be generated using a linear transformation with the constant linear multiplier A and the constant offset component B. The same linear transformation may be used throughout an overshoot period (e.g., 200 ms) starting at $T_0$ and ending at $T_2$. The augmented torque request signal Taug is increased to a level Tq4 at $T_1$ when the arbitrated torque signal Treq_a is increased to the level of Tq2 at $T_1$.

A torque reference signal Tref is generated to be equal to the augmented torque request signal Taug during the overshoot period. The torque reference signal Tref is generated to be equal to the arbitrated torque signal Treq_a after the overshoot period. An engine torque signal $T_E$ follows the arbitrated torque signal Treq_a instead of the augmented torque request signal Taug after the overshoot period.

The above-described embodiments minimize torque request response time while maintaining system stability. The linear transformation disclosed above in addition to maintaining PID gains during overshoot periods maintains system stability and prevents torque oscillation. System gain calibration is improved by separating the need for increased gains for specific conditions.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A method of operating an engine of a vehicle comprising:
    generating a first torque request;
    generating a second torque request that is greater than and based on the first torque request;
    increasing a torque output of the engine based on the second torque request at a first rate and during a first period;
    increasing the torque output of the engine based on the first torque request at a second rate and during a second period,
    wherein the first period is distinct from and before the second period, and
    wherein the first rate is greater than the second rate; and
    limiting the torque output of the engine during the first period and the second period to one of the first torque request and a threshold generated based on the first torque request.

2. The method of claim 1, wherein the first torque request is generated based on N vehicle torque requests and a driver torque request, where N is an integer that is greater than or equal to 1.

3. The method of claim 2, wherein the generating of the first torque request comprises:
    detecting one of the N vehicle torque requests; and
    generating the first torque request when the one of the N vehicle torque requests is greater than the driver torque request.

4. The method of claim 2, wherein the N vehicle torque requests comprise at least one of a chassis control torque request and a transmission control torque request.

5. The method of claim 1, wherein the second torque request is generated using a linear transformation of the first torque request, and
    wherein the linear transformation comprises at least one of a linear multiplier and an offset component.

6. The method of claim 1, further comprising generating a reference manifold absolute pressure signal:
    based on the second torque request during the first period; and
    based on the first torque request and not the second torque request during the second period.

7. The method of claim 1, further comprising:
    determining a torque threshold based on the first torque request; and
    setting the first period to expire when the torque output of the engine exceeds the torque threshold,
    wherein the torque threshold is determined based on an error tolerance relative to the first torque request, and
    wherein the torque output of the engine is increased to the first torque request based on the second torque request.

8. The method of claim 6, wherein the first period is less than or equal to 200 milliseconds.

9. The method of claim 1, further comprising increasing the torque output of the engine based on the first torque request at a third rate and during the second period when the torque output of the engine exceeds the first torque request,
    wherein the third rate is less than the second rate.

10. The method of claim 9, wherein at least one of spark timing and fuel rate is adjusted to increase the torque output of the engine at the third rate.

11. A system for an engine of a vehicle comprising:
    an arbitration module that generates a first torque request;
    a torque augmentation module that generates a second torque request; and
    a torque control module that:

increases a torque output of the engine based on the second torque request at a first rate and during a first period, and increases the torque output of the engine based on the first torque request at a second rate and during a second period, wherein the first period is distinct from and before the second period, wherein the first rate is greater than the second rate, and wherein the torque control module limits the torque output of the engine during the first period and the second period to one of the first torque request and a threshold generated based on the first torque request.

12. The system of claim 11, further comprising N vehicle control modules and a driver module, wherein the N vehicle control modules generate N respective vehicle torque requests, and wherein the driver module generates a driver torque request, where N is an integer that is greater than or equal to 1.

13. The system of claim 12, wherein the arbitration module generates the first torque request when one of the N vehicle torque requests is greater than the driver torque request.

14. The system of claim 12, wherein the N vehicle control modules comprise at least one of a chassis control module and a transmission control module.

15. The system of claim 11, wherein the torque augmentation module generates the second torque request using a linear transformation of the first torque request, and wherein the linear transformation comprises at least one of a linear multiplier and an offset component.

16. The system of claim 11, further comprising a reference manifold absolute pressure module that generates a manifold absolute pressure signal:

based on the second torque request during the first period; and based on the first torque request and not the second torque request during the second period.

17. The system of claim 11, further comprising a torque reference module that:

determines a torque threshold based on the first torque request and an error tolerance; and sets the first period to expire when the torque output of the engine exceeds the torque threshold, and wherein the torque control module increases the torque output of the engine to the first torque request based on the second torque request.

18. The system of claim 11, wherein the torque control module further increases the torque output of the engine based on the first torque request at a third rate and during the second period when the torque output of the engine exceeds the first torque request, and wherein the third rate is less than the second rate.

* * * * *